June 29, 1926.

C. LE G. FORTESCUE 1,590,435

CONTROL OF SERIES ERADICATOR MACHINES

Filed Dec. 13, 1922

WITNESSES:

INVENTOR
Charles Le G. Fortescue.
BY
ATTORNEY

Patented June 29, 1926.

1,590,435

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL OF SERIES-ERADICATOR MACHINES.

Application filed December 13, 1922. Serial No. 606,576.

My invention relates, in general, to series eradicator machines which are connected, in series-circuit relation, to an alternating-current line for the purpose of eradicating, or substantially preventing the flow of, currents of one frequency or phase-sequence while permitting the substantially unimpeded flow of currents of other frequencies or phase-sequence.

In particular, my invention relates to methods of, and apparatus for, controlling the excitation of a series eradicator machine and also to methods of, and apparatus for, applying a suitable driving torque to the series eradicator machine.

My invention consists in the methods and apparatus set forth in the following specification and claims and illustrated in the accompanying drawing, wherein—

Figure 1:
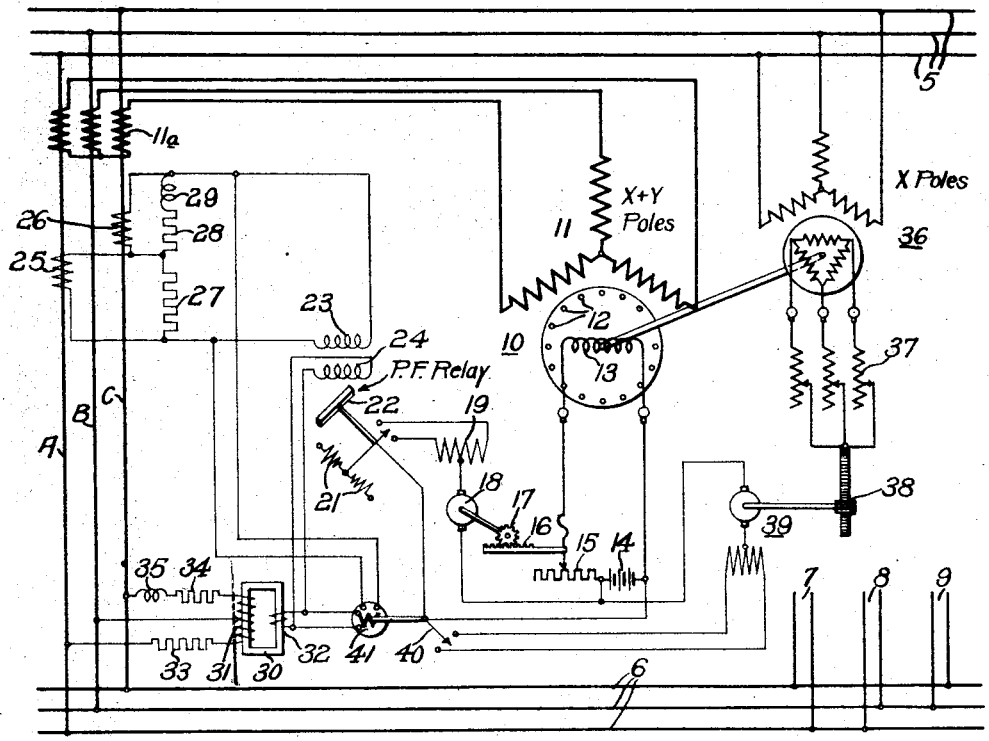
Figure 2:
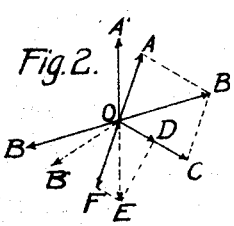
Figure 3:
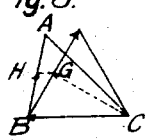
Figure 4:
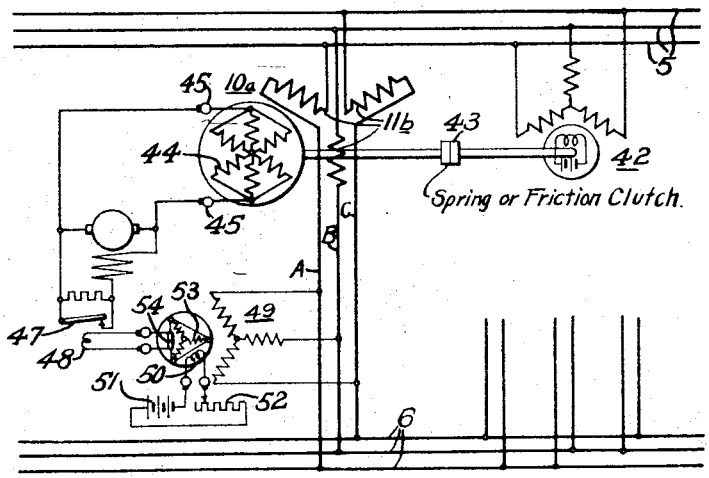

Figure 1 is a diagrammatic view of circuits and apparatus embodying my invention in a preferred form, Figs. 2 and 3 are vector diagrams illustrative of the relay apparatus shown in Fig. 1, and Fig. 4 is a diagrammatic view of circuits and apparatus showing a modification.

My invention relates to series eradicators which may be utilized either for the purpose of eradicating harmonics from an alternating-current line or for the purpose of eradicating the negative-phase-sequence or counter-rotational currents which occur in phase balancing and phase converting. In the case of an alternating-current line in which there is a tendency for the currents to be distorted in wave-form by harmonics, the fundamental currents will tend to cause the series machine to operate in a certain direction at a certain speed, whereas the harmonic components will tend to cause the series machine to operate, either in the same direction or in the opposite direction, at a higher speed.

In the case of an unbalanced polyphase line, the unbalanced polyphase voltages may be resolved into two systems of balanced component voltages tending to produce rotation in opposite directions, the major system being called the direct rotational or positive-phase-sequence system, and the minor system being called the negative-phase-sequence or counter rotational system. While the two systems have the same frequency, it will be noted that, algebraically considered, the series machine tends to run at different synchronous speeds by reason of the two balanced components, in the sense that one speed may be measured by a positive quantity and the other speed may be measured by the same quantity with the negative sign.

For the purpose of making a clear disclosure, I shall describe my system in detail as applied to a series phase balancer, but it is to be distinctly understood that my invention is by no means limited to such use.

In Fig. 1 is shown a balanced three-phase line 5 and an unbalanced three-phase line 6, the unbalancing being symbolized by three single-phase feeders 7, 8 and 9, connected to the respective phases of the unbalanced line. The two lines are tied together by a tie line ABC whereby power may be interchanged from one line to the other, and the interchanged currents are caused to be balanced by means of a series-balancer machine 10 having a primary winding 11 connected in series relationship to the tie line, as by means of current transformers 11a.

The series balancer is driven backwardly at synchronous speed with respect to the speed which it would assume by virtue of the major component currents, whereby the series machine operates at synchronous speed with respect to the minor component currents and offers a very high impedance thereto.

The machine is provided with a very good damper winding 12, whereby the field due to the direct rotational currents is damped out, and said direct rotational currents are permitted to flow substantially unimpeded. The series machine is provided, also, with a direct-current winding 13, whereby exciting currents may be supplied, as by means of the battery 14 and rheostat 15.

The operation of the series balancer depends upon the fact that a very low impedance is offered to the direct rotational currents, while a very high impedance is offered to counter rotational currents. The impedance to the direct rotational currents is reduced to a minimum by reducing the ohmic resistance of the primary and secondary windings to a minimum and by employing as small an air gap as possible and otherwise arranging the primary and secondary windings with a view to reducing the magnetic leakage between the two windings in exact conformity to the best induction-motor design. In fact the series balancer is simply an induction motor with exciting windings added to the secondary member. The eradication of the counter rotational currents is perfected by separately considering the wattless component and the load component of said counter rotational currents and by adopting means for reducing each component to zero or to a practical minimum.

If the series machine were unexcited, while being driven at synchronous speed as hereinbefore stated, it would operate as an unexcited synchronous condenser carrying lagging currents of the negative phase-sequence and, if these currents were permitted to flow, the total current in the tie line would be unbalanced. The series machine is, therefore, excited proportionally to the negative-phase-sequence voltage component, whereby the magnetizing currents are supplied from the direct-current exciting source.

In order to automatically control the rheostat 15 regulating the exciting currents, I have shown a rack 16, operated, through a pinion 17, by means of a series direct-current motor 18 having two oppositely-wound field windings 19. A switch 20 is provided for selectively energizing the regulating motor 18 from the battery 14, through the one or the other of the field windings 19, whereby the rheostat 15 may be moved in the one or the other direction.

In the particular embodiment of the invention shown, the relay 20 is biased to a neutral position by means of two springs 21 and it is automatically actuated by means of a power-factor relay 22, having windings 23 and 24, energized, respectively, in accordance with the negative-phase-sequence current component in the tie lines ABC, and the negative-phase-sequence voltage component thereof.

Any suitable means may be employed for deriving the negative-phase-sequence current and voltage components from the tie line. By way of illustration, I have shown, in Fig. 1, static systems or networks for deriving both components which are to be supplied to the power-factor relay.

The negative-phase-sequence regulating current is derived from two current transformers 25 and 26, shown as being associated with the conductors A and C, respectively. The transformer 25 is close-circuited through a resistor 27, and the current transformer 26 is close-circuited through a resistor 28 and a choke coil 29 of such relative values that the electromotive force across the impedance devices 28 and 29 is equal and opposite to the electromotive force across the impedance device 27 when the currents in the transformers 25 and 26 are equal in value and displaced 60° with respect to each other. The current transformer 25 is reversed with respect to the current transformer 26, and hence the phase difference between the corresponding currents in the conductors A and C is 120°, under the conditions just mentioned. The current transformers are connected in series opposition, and the current winding 23 of the power-factor relay is connected to be responsive to the resultant electromotive force.

The arrangement just described, and the resultant operation, will be better understood with reference to Fig. 2, where the vectors OA', OB' and OC represent the total currents flowing in the tie lines under perfectly balanced conditions. Since the resistance 27 is non-inductive, and since the current transformer 25 is reversed with respect to the current transformer 26, the potential across the current transformer 25 is shown by the vector OE, in phase opposition to the corresponding vector OA'.

In phase C, the electromotive force necessary to overcome the resistance 28 is represented by a vector OD, in phase with the vector OC, while the electromotive force necessary to overcome the inductance 29 is represented by a vector DE, lagging the vector OD by 90°. The impedances are so chosen that the resultant electromotive force OE across the current transformer 26 is the same as the electromotive force OE across the current transformer 25, when the currents are perfectly balanced. Under balanced conditions, therefore, the two terminals of the relay coil 23 have the same potential and no current is passed therethrough.

If the currents in the tie lines are unbalanced, as indicated by the vectors OA, OB and OC, assuming the vector OC unchanged, the potential of the outer terminal of the coil 26, with respect to the common terminal of the two coils, will be OE as before, while the potential of the outer terminal of the coil 25, with respect to the common terminal, will be OF, in phase opposition to the current vector OA. A resultant voltage EF is, therefore, applied to the current winding 23 of the power-factor relay. It may be shown that the phase and magnitude of the resultant voltage EF vary directly with the phase and magnitude of the counter rotational component currents in the tie lines A, B, C.

An electromotive force proportional to the counter rotational voltage in the tie lines ABC is obtained in the embodiment shown, by means of a static network comprising a transformer 30 having a primary winding 31 and a secondary winding 32. The primary winding is provided with a mid-tap which is connected to the conductor B. One terminal of the primary winding is connected to the conductor A through a resistor 33, and the other terminal of the primary winding is connected to the conductor C through resistive and inductive impedance devices 34 and 35, having such phase relationships that the currents in the two halves of the primary winding are equal in magnitude but opposite in phase, when the tie-line voltages are exactly balanced.

Fig. 3 shows the vector relationships obtained in the negative-phase-sequence voltage network. If CB represents the voltage across phase CB, the voltage drop in the choke coil 35, is represented by CG and the voltage drop in the resistor 34 is represented by GB, leading the vector CG by 90°, and the two voltage drops are designed to be such that the vector GB is superimposed upon a vector BA′ corresponding to a balanced three-phase-system. The current in the half of the primary winding 31 which is connected to the phase C is in phase with the resistance drop GB and may be represented by the same vector. The resistor 33 is of such value that the current in the phase BA′ of a perfectly balanced system will be represented by the vector BG, being equal but opposite to the current in the other half of the primary winding 31. If, however, the voltages are unbalanced, as indicated at ABC, the current in the half of the primary winding 31 which is connected to the conductor A will be represented by a vector BH, whereby a resultant current GH magnetizes the transformer 30 to induce a voltage in the secondary winding 32 which may be shown to be proportional, in phase and magnitude, to the counter rotational voltage component in the tie lines A, B, C.

In operation, when the tie-line voltages are balanced, there will be no force developed in the power-factor relay, and the springs 21 will maintain the attached switch-arm 20 in neutral position. When, however, either lagging or leading wattless counter-rotational currents are present in the tie line, the power-factor relay 22 will be energized in the one direction or the other and the regulating motor 19 will be energized to move the rheostat 15 until substantially unity power-factor conditions are restored in the negative-phase-sequence components.

The series balancing machine, when once started in the proper direction, will lock into step with the negative-phase-sequence voltages, without the aid of an externally applied driving force, provided the negative-phase-sequence voltages do not fall below a certain minimum value. A certain torque must be developed by the machine in order to maintain synchronous backward operation by itself and, in order to develop such torque, the machine will draw, or permit the flow of, load-component currents of the negative-phase-sequence in the tie line ABC.

While I do not wish to be limited to an exact statement as to the nature of the torque necessary to drive the series balancer, it may be helpful, in understanding the problem, to consider the driving torque as comprising a rather large constant component necessary to rotate the machine against windage and friction losses, a second component proportional to a power of the positive-phase-sequence current, said power being greater then unity, representing the torque necessary to overcome the iron losses and the ohmic-resistance losses resulting from the variable positive-phase-sequence currents flowing through the primary windings of the machine, and a third component to offset a small opposing torque, which varies, somewhat, with the load, representing the torque developed by the positive-phase-sequence currents at 200 per cent slip.

For the purpose of preventing the flow of the counter rotational load-component currents necessary to produce a backward driving torque in the series balancer, it is necessary to apply a certain driving torque from an external source, in order that the series balancer may permit the flow of neither motoring currents nor generated currents of the negative phase-sequence. A convenient means for driving the series balancer is shown, in Fig. 1, as comprising a small auxiliary induction motor 36 having a smaller number of poles than the balancer machine, as indicated in the drawing by marking the driving motor as having X poles and the balancing machine as having X+Y poles.

With the arrangement just described, the driving motor 36 will operate at a certain definite slip in order to drive the main balancer at synchronous speed corresponding to the larger pole-number of the latter. The driving torque developed in the motor 36 may be varied in any convenient manner, the method shown in the drawing consisting of a rheostat 37 connected in the secondary windings of the motor and controlled, through a rack-and-pinion connection 38, by a small regulating motor 39 similar to the regulating motor 18 previously described.

The regulating motor 39 may conveniently be controlled by means of a switch-arm 40 associated with a watt-meter 41 which indicates the direction of flow of the negative-phase-sequence energy. The meter shaft moves in one direction for motoring counter-rotational currents when the driving torque of the motor 36 is too small and it moves in the other direction for generated counter-rotational currents resulting from the action of the series balancer as a negative-phase-sequence generator when the driving torque of the motor 36 is too large.

The watt-meter 41 is shown as being energized from the static networks previously described for deriving electromotive forces proportional to the negative-phase-sequence currents and voltages of the tie lines ABC.

While I have described a preferred embodiment of my invention in detail, it is obviously not always necessary to employ all of the refinements illustrated. Thus, a sufficiently close balance may be obtained, in many cases, by adjusting the driving torque of the auxiliary motor 36 at a constant value which would be proper for the average load conditions, and leaving the adjustment unchanged throughout the operation of the device. In other cases, it may be further possible to dispense with the auxiliary driving motor 36 altogether. On the other hand, when the negative-phase-sequence voltage is exactly or substantially constant, as, for example, in a phase-converter application, where the negative-phase-sequence component is equal in magnitude to the positive-phase-sequence component, the means for varying the direct-current excitation may be omitted, and the series balancer may be excited either at a constant value suitable for average conditions or at one or the other of a few approximately correct values for different load conditions.

It will be noted, also, that the regulating relays shown are merely suggestive of possible methods of accomplishing the desired result. Thus, the power-factor relay is a device which is responsive, among other things, to the counter rotational voltage, and it may be replaced by a regulating device responsive solely to the counter-rotational voltage of the tie line. On the other hand, the power-factor relay is also a device responsive, among other things, to the wattless component of the counter-rotational currents, and it may be replaced by a regulator which is responsive solely to the wattless component of the negative-phase-sequence currents. The power-factor relay shown indicates the departures of the counter rotational power-factor from unity value but it also indicates such departures by developing a variable force tending to actuate a switch arm 20 against the springs 21, said variable force being proportional to the magnitude of the wattless counter-rotational-current component and also proportional to the magnitude of the counter-rotational voltage of the tie line.

In Fig. 4 is shown a slight variation of my invention in which the series balancer machine 10a is employed with its primary winding 11b conductively connected in series with the tie line ABC, instead of resorting to the current transformer 11a, shown in Fig. 1. The rotor of the phase balancer in Fig. 4 is also shown as being connected to a driving means of a different type, comprising a small synchronous motor 42 which is connected in shunt to the main line 5 and is mechanically connected to the rotor of the phase balancer through a special clutch device 43. The clutch device operates, through spring tension or friction, to transmit a driving torque to the rotor member of the phase balancer, while permitting, at the same time, a relative shift in the angular positions of the rotor member of the balancer with respect to the shaft of the driving motor, in order that the series machine may adapt itself to variations in the phase position of the negative-phase-sequence voltage with respect to the phase position of the positive-phase-sequence voltage.

The series balancer has been described, hereinabove, as having a good damper winding 12 and an exciting winding 13, and, while similar expressions may be employed in the claims appended to this specification, it is to be distinctly understood that I intend, by such language, to call for any means for performing the function of a good damper winding and also for performing the function of an exciting winding, whether the two functions are obtained in separate windings or combined in a single winding. Thus, by way of illustration, in Fig. 4, I have shown the series balancer 10a, as being provided with a six-phase star-connected secondary winding 44, having adjacent terminals thereof connected together in two diametrically opposite groups and having said groups connected to two slip-rings 45 for direct current excitation. The two groups of interconnected phase windings constitute two short-circuited systems carrying balanced polyphase double-frequency currents, whereby the functions of a damper winding are performed, the unidirectional exciting current passing diametrically through the windings produces the necessary unidirectional flux in the secondary member of the series balancer.

The exciting source is shown in Fig. 4 as comprising a direct-current exciter machine 46, the voltage of which is controlled by means of a regulator 47. The regulator 47 may be of any type known to those skilled in the art, and is indicated schematically in Fig. 4 as being controlled by a coil 48, energized in accordance with the magnitude of the counter-rotational voltage in the lines ABC.

In order to derive a controlling voltage proportional to the negative-phase-sequence-component voltage, I have shown, by way of illustration, in Fig. 4, a small auxiliary synchronous machine 49 connected to the unbalanced polyphase line 6 and having a unidirectional exciting winding 50 suitably energized from a battery 51 through a rheostat 52 and also having a polyphase short-circuited secondary winding 53 which operates as a damper winding, carrying double-frequency currents proportional to the magnitude of the counter-rotational voltages impressed across the terminals of the machine. The double-frequency currents are measured by means of a current-shunt device 54 connected in one of the phases of the damper winding 53, and the terminals of said current-shunt device are connected to the controlling winding 48 of the regulator 47, whereby the voltage of the exciter 46 is adjusted in accordance with the negative-phase-sequence-component voltage.

While I have described the operation of the auxiliary machine 49 with respect to negative-phase-sequence line-frequency voltages, it is obvious that if the line had harmonic voltages of any multiple frequency, instead of the negative-phase-sequence line-frequency voltages, the damper windings would carry currents of a frequency corresponding to the difference in speed between the rotating field produced by currents of said harmonic frequency in the primary windings, and the speed of the rotor or secondary member.

In the appended claims, I refer to any dynamo-electric machine which is connected in series with a line to block certain currents as a series eradicator machine. I also refer to a polyphase line, wherein the loads, voltages and currents are not all balanced, as an unbalanced line.

It will be apparent, from the foregoing description, that many changes and modifications may be made in the embodiment or practice of my invention without departing from the spirit thereof. I desire, therefore, that the appended claims shall be construed to embrace all such modifications and equivalents as are fairly comprehended by the terminology thereof when construed in the light of the prior art.

I claim as my invention:

1. The method of operating a series eradicator machine having primary, exciting and damper windings, which consists in changing the excitation in a predetermined manner in accordance with the wattless component of the eradicated current.

2. The method of operating a series eradicator machine having primary, exciting and damper windings, which consists in changing the excitation in a predetermined manner in accordance with the departure of the power factor of the eradicated current from unity value.

3. The method of operating a series eradicator machine having primary, exciting and damper windings, which consists in changing the excitation in a predetermined manner in accordance with the voltage of the eradicated current.

4. The method of operating a series eradicator machine having primary, exciting and damper windings, which consists in changing the excitation in a predetermined manner in accordance with the phase relation of the current and voltage vectors of the eradicated current.

5. The method of operating a dynamo-electric series phase balancer having a primary polyphase winding connected in series-circuit relation to an unbalanced line and damper and exciting windings, which consists in operating the damper and exciting windings of said machine at synchronous speed in a direction opposite to the direction of rotation of the field due to the positive-phase-sequence-component currents and changing the excitation in a predetermined manner in accordance with the wattless component of the negative-phase-sequence-component currents.

6. The method of operating a dynamo-electric series phase balancer having a primary polyphase winding connected in series-circuit relation to an unbalanced line and damper and exciting windings, which consists in operating the damper and exciting windings of said machine at synchronous speed in a direction opposite to the direction of rotation of the field due to the positive-phase-sequence component currents and changing the excitation in a predetermined manner in accordance with the departure of the power factor of the negative-phase-sequence currents from unity value.

7. The method of operating a dynamo-electric series phase balancer having a primary polyphase winding connected in series-circuit relation to an unbalanced line and damper and exciting windings, which consists in operating the damper and exciting windings of said machine at synchronous speed in a direction opposite to the direction of rotation of the field due to the positive-phase-sequence component currents and changing the excitation in a predetermined manner in accordance with the negative-phase-sequence voltage.

8. The method of operating a dynamo-electric series phase balancer having a primary polyphase winding connected in series-circuit relation to an unbalanced line and damper and exciting windings, which consists in operating the damper and exciting windings of said machine at synchronous speed in a direction opposite to the direction of rotation of the field due to the positive-phase-sequence-component currents and changing the excitation in a predetermined manner in accordance with the phase relations of the negative-phase-sequence currents and voltages.

9. The combination with a series eradicator machine, having primary, exciting and damper windings, of means for adjusting the excitation thereof, and an indicating mechanism responsive, in a predetermined manner, to the wattless component of the eradicated current passing through said machine.

10. The combination with a series eradicator machine, having primary, exciting and damper windings, of means for adjusting the excitation thereof, and an indicating mechanism responsive, in a predetermined manner, to the departure of the power factor of the eradicated current from unity value.

11. The combination with a series eradicator machine, having primary, exciting and damper windings, of means for adjusting the excitation thereof, and an indicating mechanism responsive, in a predetermined manner, to the voltage of the eradicated current impressed upon said machine.

12. The combination with a series eradicator machine, having primary, exciting and damper windings, of means for adjusting the excitation thereof, and an indicating mechanism responsive, in a predetermined manner, to the phase relation of the current and voltage vectors of the eradicated current passing through said machine.

13. The combination with a polyphase line having variably unbalanced voltages, of a dynamo-electric series phase balancer having a primary polyphase winding connected in series-circuit relation to said line, said machine having damper and exciting windings operating at synchronous speed in a direction opposite to the direction of rotation of fields due to the positive-phase-sequence-component currents, means for adjusting the excitation thereof, and an indicating mechanism responsive, in a predetermined manner, to the wattless component of the negative-phase-sequence-component currents in said line.

14. The combination with a polyphase line having variably unbalanced voltages, of a dynamo-electric series phase balancer having a primary polyphase winding connected in series-circuit relation to said line, said machine having damper and exciting windings operating at synchronous speed in a direction opposite to the direction of rotation of fields due to the positive-phase-sequence-component currents, and electro-responsive means for varying the excitation of said machine in a predetermined manner in response to the negative-phase-sequence-component currents in said line.

15. The combination with a polyphase line having variably unbalanced voltages, of a dynamo-electric series phase balancer having a primary polyphase winding connected in series circuit relation to said line, said machine having damper and exciting windings operating at synchronous speed in a direction opposite to the direction of rotation of fields due to the positive-phase-sequence-component currents, means for adjusting the excitation thereof, and an indicating mechanism responsive, in a predetermined manner, to the departure of the power factor of the negative-phase-sequence-component currents from unity value.

16. The combination with a polyphase line having variably unbalanced voltages, of a dynamo-electric series phase balancer having a primary polyphase winding connected in series-circuit relation to said line, said machine having damper and exciting windings operating at synchronous speed in a direction opposite to the direction of rotation of fields due to the positive-phase-sequence-component currents, and electro-responsive means for varying the excitation of said machine in a predetermined manner in response to the negative-phase-sequence-component voltage impressed upon said machine.

17. The combination with a polyphase line having variably unbalanced voltages, of a dynamo-electric series phase balancer having a primary polyphase winding connected in series-circuit relation to said line, said machine having damper and exciting windings operating at synchronous speed in a direction opposite to the direction of rotation of fields due to the positive-phase-sequence-component currents, means for adjusting the excitation thereof, and an indicating mechanism responsive, in a predetermined manner, to the phase relations of the negative-phase-sequence currents and voltages in said line.

18. A method of operating a series eradicating machine, said machine having a primary winding, an exciter winding and a good damper winding, said machine being connected in series with a line having desirable and undesirable component electromotive forces tending to cause said machine to operate at different synchronous speeds considered algebraically, said method comprising operating said machine at a synchronous speed corresponding to said undesirable electromotive force, supplying said machine with a torque suitable to reduce the load component of the undesirable component currents to a minimum, and supplying said machine with an exciting current suitable to reduce the wattless component of the undesirable currents to a minimum.

19. The combination with a series eradicator machine having a primary winding, an exciter winding and a good damper winding, of an alternating-current line having desirable and undesirable-component electromotive forces tending to cause said machine to operate at different synchronous speeds, considered algebraically, said machine operating at a synchronous speed corresponding to said undesirable electromotive force, means for supplying said machine with a driving torque suitable to reduce the load component of the undesirable component currents to a minimum, and means for supplying said machine with an exciting current suitable to reduce the wattless component of the undesirable currents to a minimum.

20. The combination with a series eradicating machine having a primary winding and a short-circuited secondary winding for preventing the flow of an undesirable component current while offering a low impedance to other component currents tending to cause said machine to operate at different synchronous speeds, considered algebraically, of means for supplying said machine with a driving torque for operating said machine at a synchronous speed corresponding to said undesirable current, and electro-responsive means for automatically varying such torque in such manner as to reduce the load component of the undesirable current to a minimum.

21. The combination with a series eradicating machine having a primary winding and a short-circuited secondary winding for preventing the flow of an undesirable component current while offering a low impedance to other component currents tending to cause said machine to operate at different synchronous speeds, considered algebraically, said machine also being provided with means tending to cause it to lock into synchronism with said undesirable component current, of means for supplying said machine with a driving torque for operating said machine at a synchoronous speed corresponding to said undesirable current, said means comprising a variable-speed motor capable of operating at a higher speed than said eradicator machine.

22. The combination with a line carrying alternating currents, of a dynamo-eletric machine connected in series therewith, and a variable-speed motor capable of operating at a higher speed than said machine, said motor being electrically connected across said line and mechanically connected to said machine.

23. A method of operating a series eradicating machine, said machine having a primary winding, an exciter winding and a good damper winding, said machine being connected in series with a line having desirable and undesirable component electromotive forces tending to cause said machine to operate at different synchronous speeds, considered algebraically, said method comprising operating said machine at a synchronous speed corresponding to said undesirable electromotive force, energizing said exciter winding and supplying said machine with a torque suitable to reduce the load component of the undesirable component currents to a minimum.

24. A method of operating a series eradicating machine, said machine having a primary winding, an exciter winding and a good damper winding, said machine being connected in series with a line having desirable and undesirable component electromotive forces tending to cause said machine to operate at different synchronous speeds, considered algebraically, said method comprising operating said machine at a synchronous speed corresponding to said undesirable electromotive force, and supplying said machine with an exciting current suitable to reduce the wattless component of the undesirable currents to a minimum.

25. The combination with a series eradicator machine having a primary winding, an exciter winding and a good damper winding, of an alternating-current line having a desirable and undesirable-component eletromotive forces tending to cause said machine to operate at different synchronous speeds, considered algebraically, said machine operating at a synchronous speed corresponding to said undesirable electromotive force, means for supplying said machine with a driving torque while permitting rotor of the eradicator machine to assume any angular position dependent upon the phase of the undesirable component electromotive force, and means for supplying said machine with an exciting current.

In testimony whereof, I have hereunto subscribed my name this 6th day of December, 1922.

CHARLES LE G. FORTESCUE.